United States Patent
Zhang et al.

(10) Patent No.: US 7,321,590 B2
(45) Date of Patent: Jan. 22, 2008

(54) METHODS FOR AGGREGATING CELLS TRANSPORTED IN A BONDED GROUP

(75) Inventors: Song Zhang, Kanata (CA); Andrew Deczky, Ottawa (CA); Morteza Ghodrat, Kanata (CA); Nestor Amaya, Kanata (CA)

(73) Assignee: CIENA Corporation, Linthicum, MD (US)

( * ) Notice: Subject to any disclaimer, the term of this patent is extended or adjusted under 35 U.S.C. 154(b) by 479 days.

(21) Appl. No.: 11/036,899

(22) Filed: Jan. 15, 2005

(65) Prior Publication Data

US 2005/0201379 A1 Sep. 15, 2005

(30) Foreign Application Priority Data

Jan. 16, 2004 (CA) .................................. 2,455,303

(51) Int. Cl.
*H04L 12/28* (2006.01)

(52) U.S. Cl. .................. 370/395.1; 370/394; 370/392; 370/412

(58) Field of Classification Search .................. None
See application file for complete search history.

(56) References Cited

U.S. PATENT DOCUMENTS 6,618,378 B1 * 9/2003 Giroux et al. ............ 370/395.1
2004/0022276 A1 * 2/2004 Gazier et al. ............... 370/535

* cited by examiner

*Primary Examiner*—Duc Ho
(74) *Attorney, Agent, or Firm*—Merek, Blackmon & Voorhees, LLC (57) ABSTRACT

Transporting an asynchronous transfer mode (ATM) stream through a bonding group involves properly splitting the stream into sub-streams to fit into individual member bearer's bandwidth at the transmit end, and properly merging the sub-streams to reconstruct the stream at the receive end. At the receive end, the cells can be put together in the proper sequence in a process of cell aggregation based on attached sequence numbers. Once the stream is re-constructed, the attached sequence numbers are replaced by the original field contents of the ATM headers. Methods of cell aggregation are described that assist the bonding scheme in working efficiently.

9 Claims, 6 Drawing Sheets

Figure 1 DSL Line Bonding

Figure 2 Cell Stream Split

Figure 3 Cell Aggregation

Figure 4 Centralized Double Buffering Cell Aggregation

Figure 5 Centralized Single Buffering Cell Aggregation

Figure 6 Per-bearer Buffering Cell Aggregation

METHODS FOR AGGREGATING CELLS TRANSPORTED IN A BONDED GROUP

BACKGROUND

This invention relates to telecommunication systems and more particularly to digital subscriber lines and asynchronous transfer mode communication.

This application claims priority from Canadian Patent Application No. 2,455,303 that was filed on Jan. 16, 2004, and which is incorporated here by reference.

Digital subscriber line (DSL) technologies based on asynchronous transfer mode (ATM) have been widely adopted by communication service providers to deliver broadband access services to residential and business customers, as defined by ITU-T Recommendation G991.x, G992.x, G993.x, SHDSL, ADSL VDSL Transceivers. It is of great interest for service providers to provide higher data rates at low cost so that bandwidth-demanding services, e.g., broadcast video, video on-demand, and gaming, can be available to a wider customer base. Combining (bonding) multiple physical DSL lines to carry a larger effective payload is one possible solution to this problem.

As is well known, an ATM stream consists of a set of fixed-size cells (53 bytes each) that contain a header (5 bytes) carrying routing information and a body (48 bytes) carrying the data, as defined by ITU-T Recommendation I.361, "B-ISDN ATM Layer Specification", February 1999. These cells are carried in an ATM network asynchronously, with the cells belonging to the same service being identified by their addressing information (Virtual Path and Virtual Circuit identifiers). As pointed out in Canadian Patent Application No. 2,386,453, titled "Higher Layer Bonding of Multiple Access Lines for Carrier Grade Access", it is entirely feasible to transport an ATM stream over a set of diverse physical lines (referred to here as bonded lines) by distributing the ATM cells across the member lines at the transmitter.

Nevertheless, due to the fact that the bonded lines may have different data rates and different end-to-end delays, the cells arriving at the receiver may not be in the same sequence as they were transmitted. Therefore, a sequence number is added to the header as described in Canadian Patent Application No. 2,386,453. A principal role of this sequence identifier is to allow proper reconstruction of the ATM stream at the receiver in the presence of such differences in rate and delay. While the process of distributing the cells to the members of the bonded group and adding a sequence number is straightforward, the reconstruction of the proper sequence at the receiver using a minimal set of buffers is not.

SUMMARY

In one aspect of the invention, a method of aggregating cells in a communication system employing ATM bonding is provided that includes the steps of:

a) based on attached sequence numbers, writing received cells from member links into a current aggregation buffer at addresses specified by the sequence numbers, wherein a size of the current aggregation buffer is greater than or equal to $L_1+L_2$, in which $$L_1 = 1 + \left\lceil \sum_{i=2}^{m} r_i \right\rceil$$

and $$L_2 = \left( d \cdot \sum_{i=2}^{m} R_i \right) / (53 \cdot 8)$$

and a profile of the data rates of the member links of the bonding group is given by $\{R_1, R_2, \ldots, R_m\}$, a data rate ratio profile normalized by $R_1$ is given by $\{1, r_2, \ldots, r_m\}$, and a maximum differential delay is given by d;

b) if a location at a sequence number in the current aggregation buffer is filled, writing a received cell into a next aggregation buffer at an address specified by the sequence number, wherein a size of the next aggregation buffer is greater than or equal to $L_1+L_2$;

c) initializing a write pointer to point to a predetermined location in the current aggregation buffer;

d) examining a location in at least one of the current and next aggregation buffers at an address specified by the write pointer, and if the location examined is not empty, reading out a cell stored at the location examined to a reconstructed cell stream, marking the location examined as empty, and incrementing the write pointer;

e) repeating step d) until the write pointer points to an empty location;

f) reading out the current aggregation buffer when the next aggregation buffer's location X, wherein $X \geq L_2$, is filled, and subsequently swapping the current and next aggregation buffers; and if a location in the current aggregation buffer is left unfilled when the buffer is read out, reading out the cells in the buffer starting at the write pointer.

In another aspect of the invention, a method of aggregating cells includes the steps of:

a) based on the attached sequence numbers, writing received cells from member links into a circular aggregation buffer at addresses specified by the sequence numbers, wherein a size of the current aggregation buffer is greater than $L_1+L_2$, in which $$L_1 = 1 + \left\lceil \sum_{i=2}^{m} r_i \right\rceil$$

and $$L_2 = \left( d \cdot \sum_{i=2}^{m} R_i \right) / (53 \cdot 8)$$

and a profile of the data rates of the member links of the bonding group is given by $\{R_1, R_2, \ldots, R_m\}$, a data rate ratio profile normalized by $R_1$ is given by $\{1, r_2, \ldots, r_m\}$, and a maximum differential delay is given by d;

b) using a write pointer to mark locations of received cells and marking the locations written to as full;

c) tracking locations of next cells to be read out of the buffer with a read pointer, whereby when a cell is received with a sequence number corresponding to the read pointer, that cell is read out of the buffer, the buffer location is marked as empty, and the read pointer is incremented;

d) repeating step c) until the read pointer points to a buffer location marked as empty;

e) if a difference between the write pointer and the read pointer modulo $L_{seq}$ is larger than $L_1+L_2$, either skipping the cell at the current read pointer or reading out the cell at the current read pointer as an empty cell, incrementing the read pointer, examining the buffer at the location indicated by the incremented read pointer, and reading out the cell if the buffer is full at that location, wherein $L_{seq}=2^N$; and f) repeating step e) until an empty buffer location is encountered.

In yet another aspect of the invention, a method of aggregating cells includes the steps of:

a) writing cells received from member links into respective circular buffers;

b) for each circular buffer, maintaining a write pointer and a read pointer, the write pointer being updated when a new cell is received and the read pointer being updated when a cell is read out;

c) comparing an expected sequence number against sequence numbers of cells pointed to by the read pointers, and maintaining a smallest sequence number currently available among all buffers;

d) if the comparing finds a match, reading out the indicated cell, marking the buffer location as empty, and updating the read pointer, the expected sequence number, and the smallest available sequence number;

e) repeating step d) until no match can be found or all buffers are empty;

f) when none of the buffers are empty and the smallest available sequence number is larger than the expected sequence number, updating the expected sequence number to the smallest sequence number;

g) if no match is found in step d) and some buffers are empty, activating a timer; and h) if a match is found before the timer expires, resetting the timer, and otherwise updating the expected sequence number to the smallest sequence number.

BRIEF DESCRIPTION OF THE DRAWINGS

The various features, objects, and advantages of this invention will be understood by reading this description in conjunction with the drawings, in which.

DETAILED DESCRIPTION

System Description

In an ATM-based DSL access network, a DSL transceiver at a central office (CO) is connected to a DSL transceiver at a customer premises equipment (CPE) through a regular twisted-pair phone line. Typically, a DSL transceiver can support multiple bearer channels at different rates in either the downstream (DS) or the upstream (US) direction, each of which carries a unidirectional ATM stream.

Figure 1:
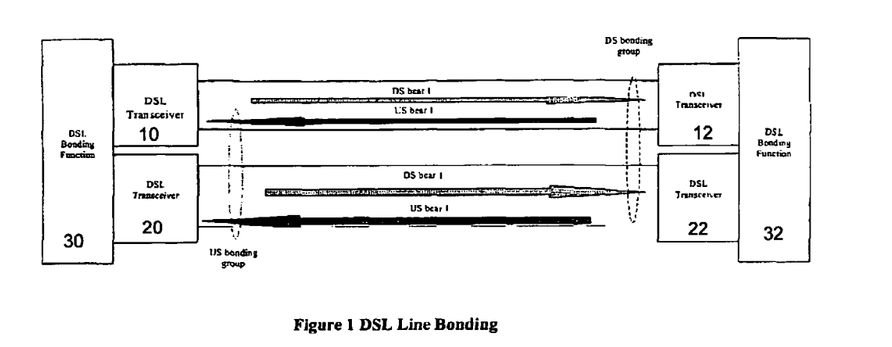
FIG. 1 illustrates a two-line DSL connection.

In a DSL line-bonding environment, multiple twisted-pair phone lines are connected between the CO and the CPE. Each line has a DSL transceiver at each end, running multiple ATM bearers just like a regular single-line configuration. Bonding groups are formed across multiple lines in each direction. A bonding group is a unidirectional ATM stream transported by multiple bearers carried across on separated physical media. FIG. 1 illustrates an example of a two-line DSL connection between DSL transceivers 10 and 12 and 20 and 22, with respective DSL bonding functions 30, 32. In this particular example, one bonding group is created in each direction as indicated by the dashed ovals. Each bonding group is made up of two ATM bearers of different rates transported over two separate physical lines. A single ATM stream is carried on the bonding group in each direction.

Figure 2:
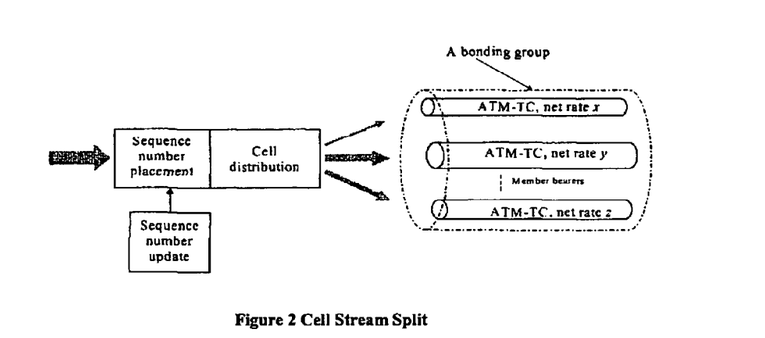
FIG. 2 illustrates splitting a stream into sub-streams to fit into individual member bearer's bandwidth at a transmit end.
Figure 3:
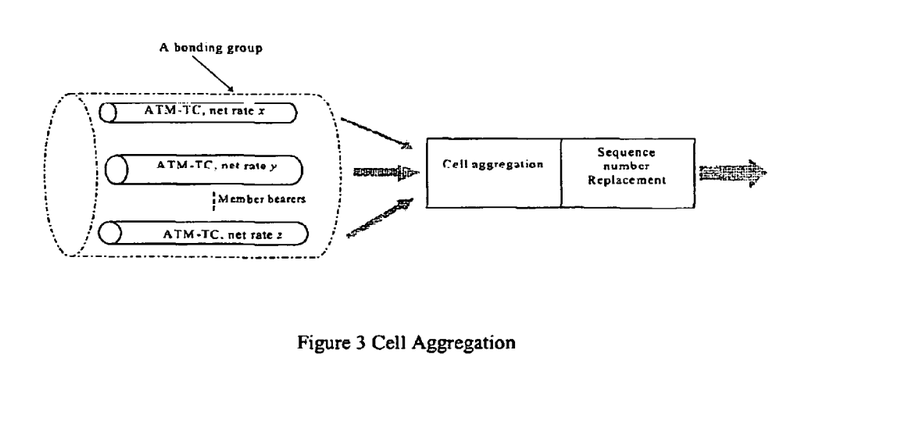
FIG. 3 illustrates merging sub-streams to reconstruct a stream at a receive end.

Transporting an ATM stream through a bonding group involves properly splitting the stream into sub-streams to fit into individual member bearer's bandwidth at the transmit end, and properly merging the sub-streams to reconstruct the stream at the receive end. One particular scheme to achieve this is to place a sequence number in each ATM cell's cell header before the stream is split as defined by ITU SG 15/Q4 Contribution D-0792, G.bond: ATM Specific Bonding Standard Framework, Catena Networks. The splitting process is illustrated in FIG. 2, and the merging process is illustrated in FIG. 3. The sequence length, $L=2^N$, and the sequence location can, in general, be negotiated. The sequence number increments by one, modulo $2^N$. Once cells are labeled with a sequence number, they can be distributed to best match the bonding group member bearers' data rates. At the receive end, the cells can be put together in the proper sequence in a process that may be called cell aggregation based on the attached sequence number. Once the stream is re-constructed, the attached sequence number is replaced by the original field content of the ATM header.

Cell aggregation can assist the bonding scheme in working efficiently. The following describes three aggregation methods using the following nomenclature and system parameters:

a bonding group's data rate (bits/s) profile, in ascending order, is given by $\{R_1, R_2, \ldots, R_m\}$;

a data rate ratio profile normalized by $R_1$ is given by $\{1, r_2, \ldots, r_m\}$;

a negotiated maximum differential delay is given by d seconds;

the sequence number size is given by $L_{seq}=2^N$; and two quantities related to buffer sizing are given by:

$$L_1 = 1 + \left\lceil \sum_{i=2}^{m} r_i \right\rceil$$

and $$L_2 = \left( d \cdot \sum_{i=2}^{m} R_i \right) \bigg/ (53 \cdot 8)$$

Centralized Double Buffering Method

Figure 4:
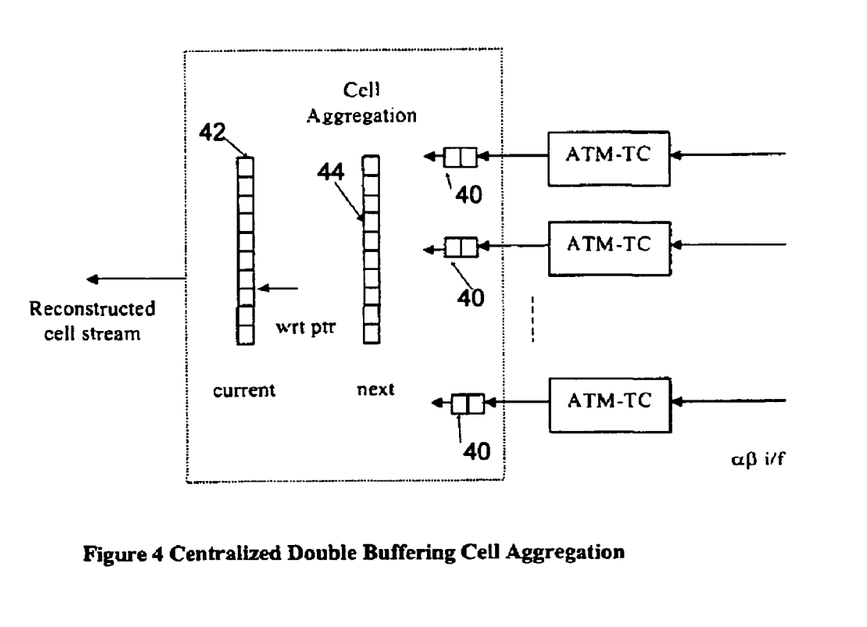
FIG. 4 illustrates cell aggregation by centralized double buffering.

Cell aggregation using a centralized double buffering scheme is illustrated in FIG. 4. Received data cells are, optionally, first buffered through a small receive (rx) first-in first-out (FIFO) buffer 40 on each bearer, and then are written into two aggregation buffers 42, 44 called current and next, respectively. The reason for this is that the cells are written into the buffers at the address specified by the sequence number to simplify the implementation. Since the sequence number can roll over before all the cells in the current sequence have been received, a second buffer is needed to keep these cells.

Figure 7:
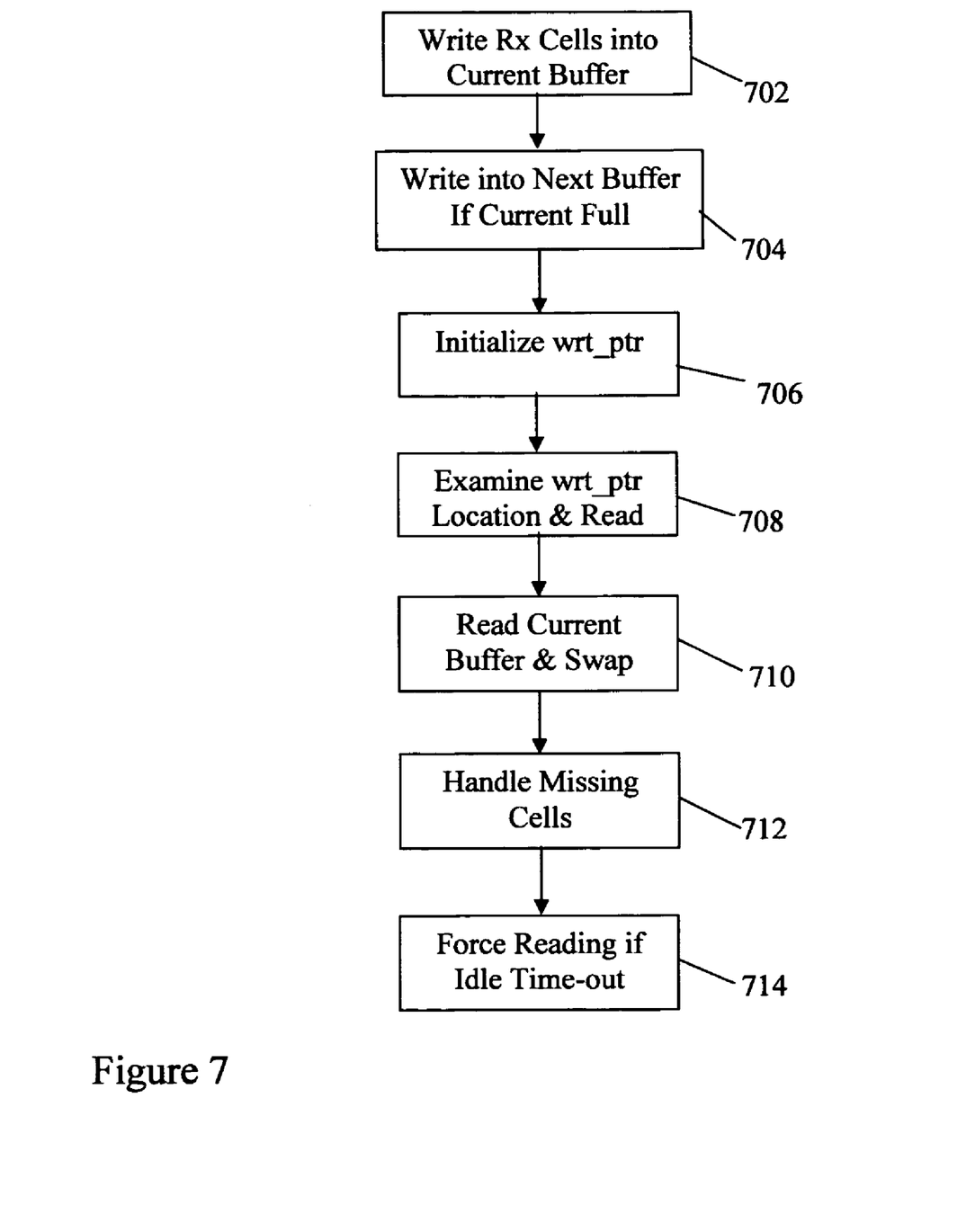
FIG. 7 is a flow chart of a centralized double buffering aggregation method.

The steps of a centralized double buffering aggregation method are described below and depicted in the flow chart of FIG. 7.

Step 702) Based on the attached sequence number, rx cells from individual DSL lines are written into the current aggregation buffer at the address specified by the sequence number.

Step 704) If the location at the received sequence number in the current buffer is filled, the rx cell is written into the next aggregation buffer at the address specified by the sequence number.

Step 706) A pointer wrt_ptr is defined and initialized to point to location 0 in the current buffer.

Step 708) After a cell is received and put into the aggregation buffers, the buffer location at the wrt_ptr is examined, and if it is not empty, the cell is read out to the reconstructed cell stream, the cell is marked empty, and the wrt_ptr is incremented. This process is repeated until the wrt_ptr points to an empty cell Step 710) The current buffer is read out (flushed) when the next buffer's location X (X$\geq$L$_2$) is filled. Subsequently, the two buffers swap, e.g., the next buffer becomes the current buffer and the current buffer becomes the next buffer. Each aggregation buffer size is L$\geq$L$_1$+L$_2$.

Step 712) Due to cell delineation or header error correction (HEC) failure at the ATM-TC layer, there could be memory locations left unfilled in the current buffer when it is flushed. In that case, all the cells in the buffer starting at wrt_ptr will be read out. How missing cells are handled is optional: they can be skipped or replaced with empty cells. In order to avoid aggregation ambiguity caused by sequence number wrap around, 2L$\leq$L$_{seq}$.

Step 714) A timer is required to track the aggregation buffer write pointer's idle time to force flushing on both buffers to prevent a so-called "orphan cells" scenario, i.e., cells are stuck in the buffers when the ATM traffic burst ends.

This method has an advantage of simplicity, but it requires twice as much buffer space as a centralized approach and a longer delay before missing cells are discarded.

Centralized Single Buffering Method

Figure 5:
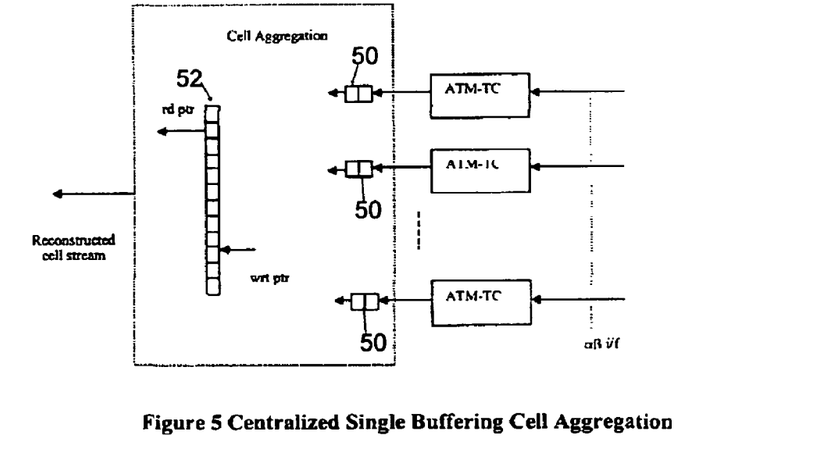
FIG. 5 illustrates cell aggregation by centralized single buffering.

Cell aggregation using a centralized single buffering scheme is illustrated in FIG. 5. Received data cells are, optionally, first buffered through a small rx FIFO 50 on each bearer, and then are written into a single circular aggregation buffer 52. The steps of a centralized single buffering aggregation method are described below and depicted in the flow chart of FIG. 8.

Figure 8:
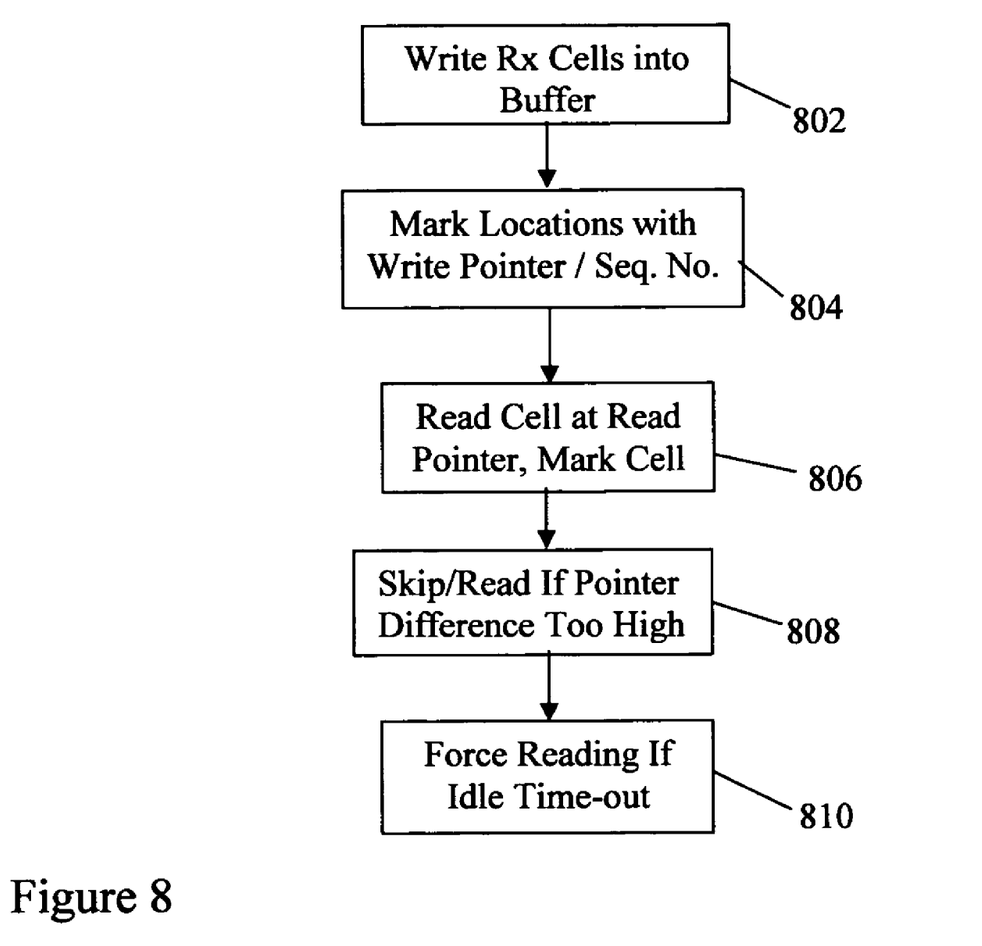
FIG. 8 is a flow chart of a centralized single buffering aggregation method.

Step 802) Based on the attached sequence number, rx cells from individual DSL lines are written into a single aggregation buffer at the address specified by the sequence number, and the location written to is marked as full.

Step 804) As cells arrive, a write pointer is used to mark the location of the received cell. This location is the sequence number of the received cell modulo L$_{seq}$.

Step 806) A read pointer is used to track the location of the next cell that is to be read out of the buffer. Once a cell arrives with a sequence number (modulo L$_{seq}$) equal to the read pointer, that cell is read out of the buffer, the buffer location is marked as empty, and the read pointer is incremented by one (modulo L$_{seq}$). This process is repeated until the read pointer is at a buffer address marked as empty. Thus, the read pointer is the address of the last cell read out of the buffer plus one (modulo L$_{seq}$).

A hole is formed when there is a discontinuity of aggregated cell locations in the buffer due to one or more missing cells (which can occur either because of transmission errors or due to differential delay making some cells arrive late). Blocks of cells that are separated by holes will form over the time. A block of cells is read out as long as there are no holes between the read pointer and the block. After a cell is read-out, the read pointer is updated and the buffer locations are marked as empty as outlined above. Under normal conditions, the buffer is sized such that holes in between are filled before the read and write pointers become L$_1$+L$_2$ apart, i.e., the read and write pointers should never be more than L$_1$+L$_2$ apart.

Step 808) If cells are missing due to HEC or cell delineation errors, the read pointer will stall. If the difference between a write pointer and the read pointer, modulo L$_{seq}$, becomes larger than L$_1$+L$_2$, the cell at the current read pointer is either skipped or read out as an empty cell, and the read pointer is incremented. The buffer at the new read pointer is examined, and the cell is read out normally if the buffer is full there. This process continues until an empty buffer location is encountered. The circular buffer size is L>L$_1$+L$_2$. In order to avoid aggregation ambiguity caused by sequence number wrap-around, L$\leq$L$_{seq}$.

Step 810) A timer is required to track the buffer write pointer's idle time to force flushing, e.g., read pointer catch-up with the write pointer, ignoring the holes in between, to prevent an "orphan cells" scenario.

This method has an advantage of a minimal buffer size. It has moderate complexity and will discard missing cells sooner than the single buffer method.

Per-Bearer Buffering Method

Figure 6:
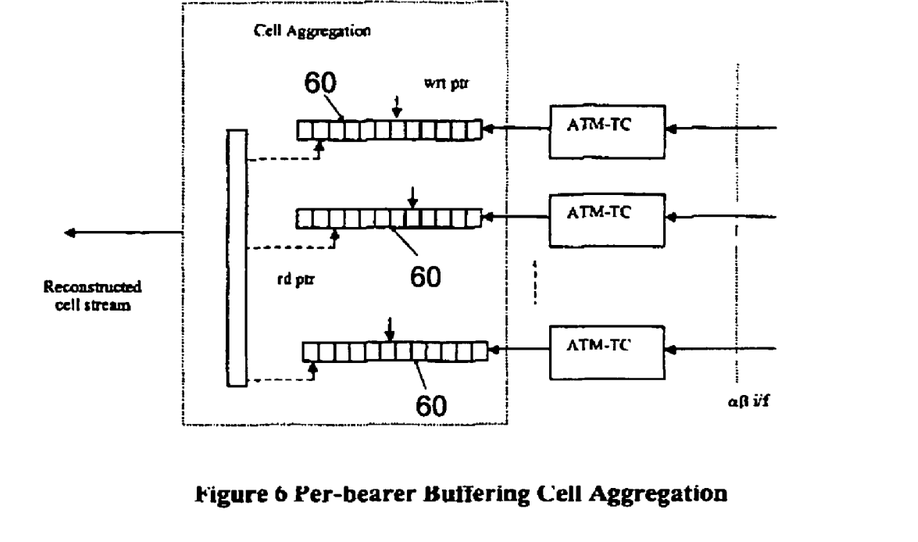
FIG. 6 illustrates cell aggregation by per-bearer buffering.

Cell aggregation using a per-bearer buffering scheme is illustrated in FIG. 6. Received cells are buffered at individual ATM-TC bearer outputs by buffers 60 and are read out in order. The steps of a per-bearer buffering aggregation method are described below and depicted in the flow chart of FIG. 9.

Figure 9:
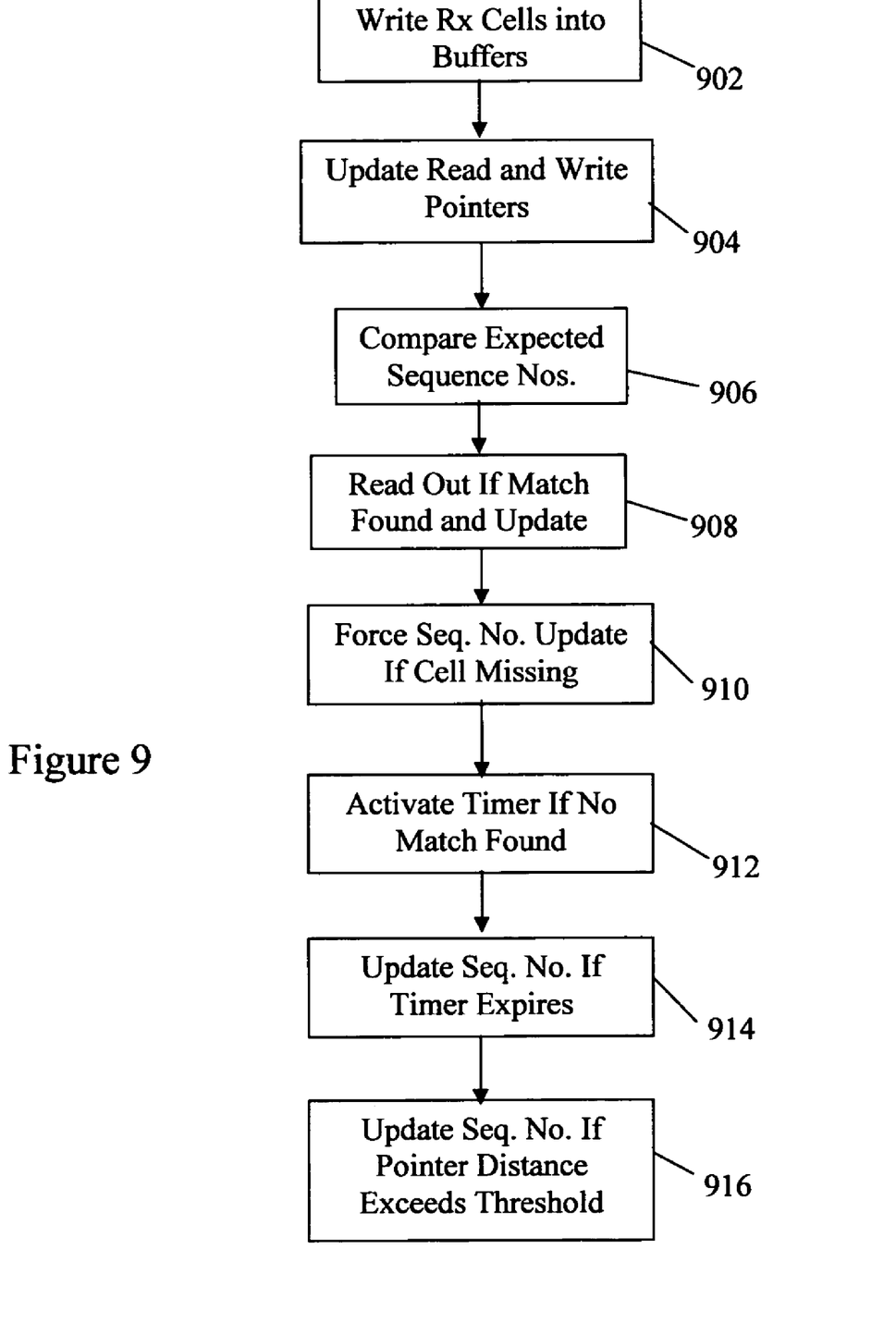
FIG. 9 is a flow chart of a per-bearer aggregation method.

Step 902) At each ATM-TC bearer output, cells from ATM-TC are written into a circular rx cell buffer. Each buffer's size is L$_i$$\geq$r$_i$+(d·R$_i$)/(53·8).

Step 904) Every rx cell buffer maintains a read pointer and a write pointer in a circular fashion. The write pointer is updated when new cells are received, and the read pointer is updated when cells are read out.

Step 906) Aggregation logic compares the expected sequence number against those of cells that individual read pointers point to. At the same time, the smallest sequence number currently available among all rx cell buffers is maintained. When a match is found (step 908), the cell is read out, the buffer is marked as empty, and the read pointer, the expected sequence number, and the smallest available sequence number are updated. This operation is repeated until no match can be found or all buffers are empty.

Step 910) When none of the rx cell buffers are empty, cell-missing events can be identified if the smallest available sequence number is bigger than the expected one. When such an event happens, the expected sequence number is forced to be updated to be equal to the currently-available smallest sequence number to continue the aggregation process with step 912.

Step 912) If no match can be found while some buffers are empty, a global timer is activated. If a match is found before the timer expires, the timer is reset and aggregation continues. The timer value should reflect the worst scenario with the combination of slowest rate and largest differential delay. If the timer expires (step 914), the expected sequence number is forced to be updated to be equal to the currently-available smallest sequence number to continue the aggregation process in step 912.

Step 916) For each rx cell buffer, the read/write pointers should never be more than $r_i+(d \cdot R_i)/(53 \cdot 8)$ apart. (This condition can be relaxed as long as the write pointer does not catch up with the read pointer, depending how each buffer is sized.) When the read/write pointers' distance passes the threshold, the expected sequence number is forced to be updated to be equal to the currently-available smallest sequence number to continue the aggregation process in step 912, until the distance becomes smaller than the threshold.

This method comprises moderate complexity and will discard missing cells sooner than the single buffer method. It requires somewhat more buffer space than the centralized approach if the rates on the bonded lines are different.

It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of aggregating cells in a communication system employing asynchronous transfer mode (ATM) bonding, wherein a stream of cells is split among a plurality of member links in a bonding group and sequence numbers are attached to cell headers, comprising the steps of:
   a) based on the attached sequence numbers, writing received cells from member links into a current aggregation buffer at addresses specified by the sequence numbers, wherein a size of the current aggregation buffer is greater than or equal to $L_1+L_2$, in which $$L_1 = 1 + \left\lceil \sum_{i=2}^{m} r_i \right\rceil$$

and $$L_2 = \left( d \cdot \sum_{i=2}^{m} R_i \right) / (53 \cdot 8)$$

and a profile of the data rates of the member links of the bonding group is given by $\{R_1, R_2, \ldots, R_m\}$, a data rate ratio profile normalized by $R_1$ is given by $\{1, r_2, \ldots, r_m\}$, and a maximum differential delay is given by d;
   b) if a location at a sequence number in the current aggregation buffer is filled, writing a received cell into a next aggregation buffer at an address specified by the sequence number, wherein a size of the next aggregation buffer is greater than or equal to $L_1+L_2$;
   c) initializing a write pointer to point to a predetermined location in the current aggregation buffer;
   d) examining a location in at least one of the current and next aggregation buffers at an address specified by the write pointer, and if the location examined is not empty, reading out a cell stored at the location examined to a reconstructed cell stream, marking the location examined as empty, and incrementing the write pointer;
   e) repeating step d) until the write pointer points to an empty location;
   f) reading out the current aggregation buffer when the next aggregation buffer's location X, wherein $X \geq L2$, is filled, and subsequently swapping the current and next aggregation buffers; and
   if a location in the current aggregation buffer is left unfilled when the buffer is read out, reading out the cells in the buffer starting at the write pointer.

2. The method of claim 1, wherein missing cells are either skipped or replaced with empty cells.

3. The method of claim 1, further comprising the step of forcing reading out of the current and next aggregation buffers after expiration of a set period of idle time of the write pointer.

4. The method of claim 1, further comprising the step of buffering received cells in buffer memories on each link.

5. A method of aggregating cells in a communication system employing asynchronous transfer mode (ATM) bonding, wherein a stream of cells is split among a plurality N of member links in a bonding group and sequence numbers are attached to cell headers, comprising the steps of:

a) based on the attached sequence numbers, writing received cells from member links into a circular aggregation buffer at addresses specified by the sequence numbers, wherein a size of the current aggregation buffer is greater than $L_1+L_2$, in which $$L_1 = 1 + \left\lceil \sum_{i=2}^{m} r_i \right\rceil$$

and $$L_2 = \left( d \cdot \sum_{i=2}^{m} R_i \right) \Big/ (53 \cdot 8)$$

and a profile of the data rates of the member links of the bonding group is given by $\{R_1, R_2, \ldots, R_m\}$, a data rate ratio profile normalized by $R_1$ is given by $\{1, r_2, \ldots, r_m\}$, and a maximum differential delay is given by d;

b) using a write pointer to mark locations of received cells and marking the locations written to as full;

c) tracking locations of next cells to be read out of the buffer with a read pointer, whereby when a cell is received with a sequence number corresponding to the read pointer, that cell is read out of the buffer, the buffer location is marked as empty, and the read pointer is incremented;

d) repeating step c) until the read pointer points to a buffer location marked as empty;

e) if a difference between the write pointer and the read pointer modulo $L_{seq}$ is larger than $L_1+L_2$, either skipping the cell at the current read pointer or reading out the cell at the current read pointer as an empty cell, incrementing the read pointer, examining the buffer at the location indicated by the incremented read pointer, and reading out the cell if the buffer is full at that location, wherein $L_{seq}=2^N$; and f) repeating step e) until an empty buffer location is encountered.

6. The method of claim 5, further comprising the step of forcing reading out of the buffer after expiration of a set period of idle time of the write pointer.

7. The method of claim 5, further comprising the step of buffering received cells in buffer memories on each link.

8. A method of aggregating cells in a communication system employing asynchronous transfer mode (ATM) bonding, wherein a stream of cells is split among a plurality of member links in a bonding group and sequence numbers are attached to cell headers, comprising the steps of:

a) writing cells received from member links into respective circular buffers;

b) for each circular buffer, maintaining a write pointer and a read pointer, the write pointer being updated when a new cell is received and the read pointer being updated when a cell is read out;

c) comparing an expected sequence number against sequence numbers of cells pointed to by the read pointers, and maintaining a smallest sequence number currently available among all buffers;

d) if the comparing finds a match, reading out the indicated cell, marking the buffer location as empty, and updating the read pointer, the expected sequence number, and the smallest available sequence number;

e) repeating step d) until no match can be found or all buffers are empty;

f) when none of the buffers are empty and the smallest available sequence number is larger than the expected sequence number, updating the expected sequence number to the smallest sequence number;

g) if no match is found in step d) and some buffers are empty, activating a timer; and h) if a match is found before the timer expires, resetting the timer, and otherwise updating the expected sequence number to the smallest sequence number.

9. The method of claim 8, further comprising the step of updating the expected sequence number to the smallest available sequence number when a distance between the read and write pointers for a buffer passes a threshold.

* * * * *